(12) United States Patent
Mizuo et al.

(10) Patent No.: US 7,736,288 B2
(45) Date of Patent: Jun. 15, 2010

(54) METHOD AND APPARATUS FOR PRODUCING BAG WITH MOUTH MEMBER

(75) Inventors: Takayuki Mizuo, Yokohama (JP);
Teruaki Nakagawa, Yokohama (JP);
Nobuhiro Matsumoto, Azumino (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 202 days.

(21) Appl. No.: 10/594,841

(22) PCT Filed: Mar. 28, 2005

(86) PCT No.: PCT/JP2005/006526

§ 371 (c)(1),
(2), (4) Date: Sep. 28, 2006

(87) PCT Pub. No.: WO2005/095089

PCT Pub. Date: Oct. 13, 2005

(65) Prior Publication Data

US 2008/0254962 A1    Oct. 16, 2008

Related U.S. Application Data

(60) Provisional application No. 60/560,620, filed on Apr. 9, 2004.

(30) Foreign Application Priority Data

Mar. 30, 2004  (JP) ............................... 2004-097452
Jan. 20, 2005  (JP) ............................... 2005-012590

(51) Int. Cl.
*B31B 1/84* (2006.01)
(52) U.S. Cl. ...................... 493/213; 493/374; 493/379; 493/267

(58) Field of Classification Search ................... 53/403, 53/405, 408; 493/374, 379, 388–389, 210, 493/212–215, 208, 267, 467
See application file for complete search history.

(56) References Cited

U.S. PATENT DOCUMENTS 4,566,923 A * 1/1986 Mueller ....................... 156/69

(Continued)

FOREIGN PATENT DOCUMENTS

JP       S61-262118 A     11/1986

(Continued)

*Primary Examiner*—Christopher Harmon
(74) *Attorney, Agent, or Firm*—Sughrue Mion, PLLC

(57) ABSTRACT

A method is provided for producing a bag with a mouth member by liquidtightly melt-bonding a mouth member comprising a thermoplastic resin and a bag unit comprising a relatively soft flexible film, in which uniform surface temperature of the mouth member is realized, generation of an A-shaped gap is prevented, and a bag with a mouth member excellent in the liquidtightness of the melt-bonded part between the mouth member and the bag unit is produced; and also a production apparatus therefor is provided. The method comprises a preheating step of heating a tubular mouth member while rotating it around the cylinder axis thereof, and a melt-bonding step of inserting the heated mouth member into the opening part of a bag unit and pressing, and thereby melt-bonding the mouth member to the opening part of the bag unit.

9 Claims, 5 Drawing Sheets

U.S. PATENT DOCUMENTS

| | | | |
|---|---|---|---|
| 4,619,797 A * | 10/1986 | Chlystun | 264/40.1 |
| 4,691,835 A * | 9/1987 | Mueller | 215/246 |
| 4,710,157 A * | 12/1987 | Posey | 493/213 |
| 5,429,699 A * | 7/1995 | Abrams et al. | 156/252 |
| 5,624,528 A * | 4/1997 | Abrams et al. | 156/556 |
| 5,776,045 A * | 7/1998 | Bodolay et al. | 493/215 |
| 5,855,544 A * | 1/1999 | Buchanan | 493/102 |
| 6,632,312 B1 * | 10/2003 | Katsuyama | 156/194 |
| 6,668,517 B2 * | 12/2003 | Hiramoto et al. | 53/133.2 |
| 6,846,256 B2 * | 1/2005 | Pang | 474/136 |
| 7,306,553 B2 * | 12/2007 | Mizuo et al. | 493/87 |

FOREIGN PATENT DOCUMENTS

| | | | |
|---|---|---|---|
| JP | 3-49762 A | | 3/1991 |
| JP | 7-1587 A | | 1/1995 |
| JP | 7-16956 A | | 1/1995 |
| JP | 7-47104 A | | 2/1995 |
| JP | 3048486 B2 | | 3/2000 |
| JP | 2001291710 | * | 10/2001 |
| JP | 2004-148578 A | | 5/2004 |
| WO | WO 2004/039562 A1 | | 5/2004 |

* cited by examiner

METHOD AND APPARATUS FOR PRODUCING BAG WITH MOUTH MEMBER

CROSS-REFERENCE TO RELATED APPLICATIONS

Priority is claimed on Japanese Patent Application No. 2004-97452, filed on Mar. 30, 2004, Japanese Patent Application No. 2005-12590, filed Jan. 20, 2005, and U.S. Provisional Patent Application No. 60/560,620, filed Apr. 9, 2004, the contents of which are incorporated herein by reference.

TECHNICAL FIELD

The present invention relates to a method for producing a bag with a mouth member for housing various medical preparations, physiological saline, infusion solutions (e.g., glucose solution and blood), or the like. More specifically, the present invention relates to a heating method for use in the preheating step of a mouth member, which is effective in liquidtightly melt-bonding a tubular mouth member comprising a thermoplastic resin to a bag unit comprising a relatively soft flexible film. The present invention also relates to a production apparatus for use in the above-described production method.

BACKGROUND ART

Bags with mouth members are used for medical containers such as infusion bags, food containers with a spout, and the like. In the field of medical containers, use of medical containers comprising synthetic resin instead of conventional glass-made medical containers has increased. Synthetic resin-made medical containers include containers produced by blow molding, and bag-like containers made by using a flexible film which is produced by inflation or T-die molding. In particular, the case of using bag-like containers produced from flexible film is increasing.

This is because, for example, bag-like containers made by using a flexible film have a thin and uniform wall thickness enabling reduction of volume after use and in turn reduction of waste, the infusion solution is discharged at an almost constant rate until the last on transfusing the content, and when the liquid is reduced, the volume of container can be reduced without allowing the invasion of air and, therefore, can be kept free from contamination with miscellaneous bacteria due to air. FIG. 8 shows, as an example of a medical container used at present, an infusion solution bag being a bag with a mouth member, wherein a bag unit comprises a flexible film 2 for housing a medical liquid and a hollow cylinder 1 shown in FIG. 9 working as a mouth member for filling or discharging the medical liquid which are fixed by interposing the mouth member 1 between two film sheets 21 of the bag unit and heat-bonding these.

In a bag with a mouth member, for fixing the mouth member to the film, a three-dimensionally shaped mouth member must be liquidtightly fixed to a two-dimensional planar film and, as shown in FIG. 10, an A-shaped gap 22 is sometimes generated between the two film sheets and the melt-bonding part of the mouth member (hereinafter, this gap is referred to as an "A-shaped gap") causing leakage of the liquid content. Particularly, in the case of a thick film having a film thickness of 100 μm or more, even though the film is deformed in agreement with the shape of the mouth member at the time of the melt-bonding under heat, the melt-bonded portion sometimes become separated due to the restoring stress of the film. Furthermore, on melt-bonding the mouth member and the film by sandwiching these with a sealing mold, the film may be subject to excess tensile stress in making it match the shape of the mouth member and this bears a risk of thinning the film or forming a hole in the film.

For preventing such deformation or hole formation in the film due to heat, a method of stacking a heat-resistant layer on the film via an adhesive and using the resulting laminate film enhanced in heat resistance, and a method of fixing the film and the mouth member with use of an adhesive are known. However, the adhesive sometimes dissolves out and its use is not preferred in the medical field. Accordingly, there is demand for integration of the film and the mouth member directly by melt-bonding.

The melt-bonding of a mouth member to a bag unit is performed by inserting the mouth member into the opening part of the bag unit and externally pressing these under heat. However, when pressed under heat, the flexible film of the bag unit melts, due to elevation of the temperature, earlier than the mouth member and is readily thinned and thus the thinning of the flexible film causes a decrease in the drop strength of bag, easy formation of pinholes and in turn a reduction in the productivity when manufacturing the bag with a mouth member.

As a method for liquidtightly melt-bonding a bag unit comprising a flexible film and a mouth member without generating an A-shaped gap in order to improve productivity, a method of melt-bonding the film by using a heated mouth member is known.

In the preheating step of the mouth member, the heating must be performed to make the surface temperature of the mouth member uniform so that a resin in an amount sufficiently large to fill the A-shaped gap can be melted and extended from the mouth member to the space between films to unfailingly prevent liquid leakage when the mouth member is melt-bonded with a film in a later step, so that the seal strength between the mouth member and the film can be uniform, and so that the mouth member can be prevented from thermal deformation.

As for the technique of heating a mouth member, a technique of melt-bonding the mouth member by heating it with radiant heat is disclosed (see, for example, Patent Document 1).

According to the method described in Patent Document 1, the surface layer in the melt-bonding part of a mouth member is heated at a temperature from the softening point of the material in the melt-bonding part of the mouth member to a temperature 13° C. higher than the melting point by using radiant heat of a heater at a temperature of 600 to 800° C. in advance of melt-bonding the mouth member to a film, the heated mouth member is pressed from both sides by thin strip-shaping molds symmetrical with respect to the mouth member to shape a fin-like thin strip, the mouth member maintained in the heated state is inserted between films, and the mouth member is melt-bonded to the film by using a heat-sealing mold. As for the heater used here for heating, in the case where the mouth member has a complete round shape, a ring-like heater having a diameter several mm larger than the diameter of the melt-bonding part of the mouth member is used.

In the method for the preheating step described in Patent Document 1, the radiant heating must be performed by disposing the ring-like heater and the cylindrical mouth member so that the center of the ring matches with the cylinder axis, so that the melt-bonding part surface of the cylindrical mouth member can be uniformly heated.

In this method, for elevating the heating efficiency, the inner diameter of the ring-like heater is made larger by at least about 2 to 3 mm than the outer diameter of the melt-bonding part of the cylindrical mouth member, and this amounts to an inner diameter of about 10 to 30 mm as estimated from the size of commonly employed cylindrical mouth members. Such a small ring-like heater readily has unevenness in the temperature distribution of the heat generating part and even when the cylinder axis of the cylindrical mouth member and the center of the ring-like heater are matched, the surface temperature of the mouth member is not necessarily uniform. In general, an operation of subtly adjusting the relative positions of the mouth member and the ring-like heater and deciding the positions while observing the melted state of the mouth member surface with the eye is necessary and this requires a great deal of labor and time, and further requires much skill.

If this operation is improper, a non-uniform temperature distribution results on the mouth member surface, as a result, there arise many fatal failures such as liquid leakage due to non-uniform flow of the melted resin into the A-shaped gap from the mouth member in the later step, separation or bag breakage due to local reduction of the film melt-bonded strength, and deformation of the mouth member due to partial melting or unbalanced thermal expansion thereof. Also, if the surface temperature of the mouth member becomes excessively high, defective mouth member resin may be generated and this defective product may be fitted into the melt-welding part and cause liquid leakage or may intrude into the bag.

Accordingly, securing a uniform surface temperature of the mouth member in the preheating step is a very important factor for ensuring stable production of a high-quality bag with a mouth member and the realization of easily and reliably of a uniform surface temperature of the mouth member is a major goal.

Patent Document 1: Japanese Patent No. 3048486

DISCLOSURE OF THE INVENTION

The present invention has been made under these circumstances and a main object of the present invention is to provide a production method capable of realizing a uniform surface temperature of the mouth member in the preheating step, stably preventing generation of an A-shaped gap and thereby obtaining a bag with a mouth member excellent in the liquidtightness of the melt-bonded part between the mouth member and the bag unit, and also to provide a production apparatus therefor.

As a result of intensive investigations on methods for producing a bag with a mouth member by melt-bonding a mouth member and a bag unit, where generation of an A-shaped gap can be prevented, the present inventors have found that when a tubular mouth member is rotated around its cylinder axis, uniform surface temperature of the mouth member can be realized.

That is, the present invention relates to a method and an apparatus for producing a bag with a mouth member, described in (1) to (12) below.

(1) A method for producing a bag with a mouth member by melt-bonding a tubular mouth member comprising a thermoplastic resin and a bag unit comprising a flexible film, the method comprising preheating the tubular mouth member while rotating it around the cylinder axis thereof, inserting the heated mouth member into an opening part of the bag unit and pressing and thereby melt-bonding the mouth member to the opening part of the bag unit.

(2) The method for producing a bag with a mouth member as described in (1) above, wherein the preheating is performed by radiant heat.

(3) The method for producing a bag with a mouth member as described in (1) or (2) above, wherein in the course of inserting the heated mouth member into the opening part of the bag unit and pressing melt-bonding, the inside of the bag unit is decompressed by sucking out air inside the bag unit.

(4) The method for producing a bag with a mouth member as described in any one of (1) to (3) above, wherein the bag with a mouth member is produced by making a mouth member-rotator travel through a circuit of preheating where the mouth member is set on a mouth member-rotator and heated while rotating, and melt-bonding where the mouth member on the mouth member-rotator is melt-bonded to the opening part of a bag unit, cooled and removed together with the bag as a bag with a mouth member.

(5) A bag with a mouth member produced by the production method of a bag with a mouth member described in any one of (1) to (4) above.

(6) An apparatus for producing a bag with a mouth member by melt-bonding a tubular mouth member comprising a thermoplastic resin and a bag unit comprising a flexible film, the apparatus comprising a preheater for the mouth member, and a mouth member-rotator for rotating the heated tubular mouth member around the cylinder axis of the mouth member.

(7) An apparatus for producing a bag with a mouth member by melt-bonding a tubular mouth member comprising a thermoplastic resin and a bag unit comprising a flexible film, the apparatus comprising a mouth member-rotator for rotating a tubular mouth member around the cylinder axis of the mouth member, a mouth member supplier for supplying and setting a mouth member to the rotator, a preheater for the rotating mouth member, a melt bonding device for inserting the heated mouth member into the opening part of a bag unit and pressing and, thereby, melt-bonding the mouth member and the opening part of the bag unit, a cooler for the melt-bonded bag with a mouth member, and a removing device for removing the cooled bag with a mouth member.

(8) The apparatus for producing a bag with a mouth member as described in (6) or (7) above, wherein the mouth member-rotator comprises a support member for slidably supporting a mouth member, a support member basal end part for removably fixing the non-heated part of the mouth member to the support member, and a driven unit for rotating the mouth member.

(9) The apparatus for producing a bag with a mouth member as described in any one of (6) to (8) above, wherein the mouth rotator is fitted to be moved sequentially through a circuit of mouth member supplying, preheating, melt-bonding, cooling, and removing the bag with a mouth member.

(10) The apparatus for producing a bag with a mouth member as described in any one of (6) to (9) above, wherein the heat source of the preheater has a linear shape.

(11) The apparatus for producing a bag with a mouth member as described in any one of (6) to (10) above, wherein the heat source of the preheater comprises a pair of opposing heat sources.

(12) The apparatus for producing a bag with a mouth member as described in any one of (6) to (11) above, wherein the mouth member-rotator has a duct for sucking out the air inside the bag with a mouth member.

The above-described object is attained by the development of this production method and this apparatus.

According to the method for producing a bag with a mouth member of the present invention, the surface of the mouth member is uniformly heated in the preheating and by virtue of uniform surface temperature, a fin-like thin strip can be unfailingly shaped and generation of an A-shaped gap can be stably inhibited, so that liquid leakage from the bag with a mouth member can be prevented. Furthermore, the film constituting the bag unit can be prevented from thinning due to over-heating of the mouth member, so that the bag can maintain high drop strength and the productivity of manufacturing the bag with a mouth member, such as medical container, can be elevated. Therefore, the production method of the present invention is useful.

BEST MODE FOR CARRYING OUT THE INVENTION

Figure 1:
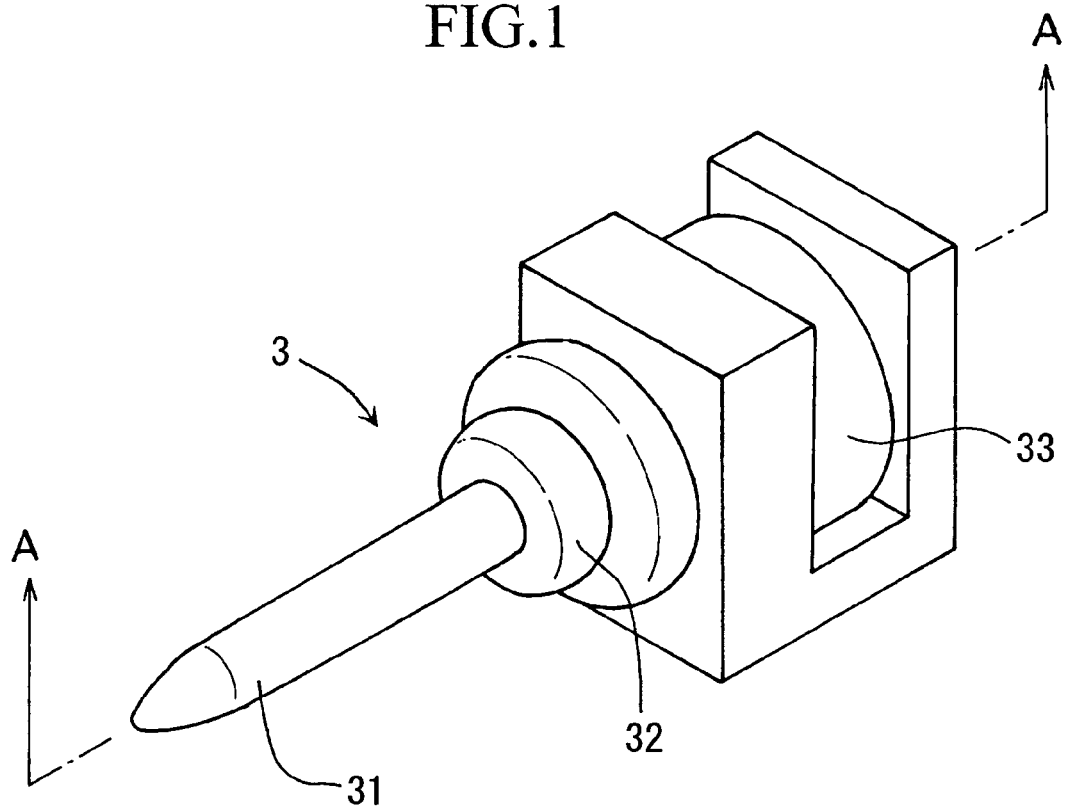
FIG. 1 is a perspective view showing one example of the mouth member-rotator.
Figure 2:
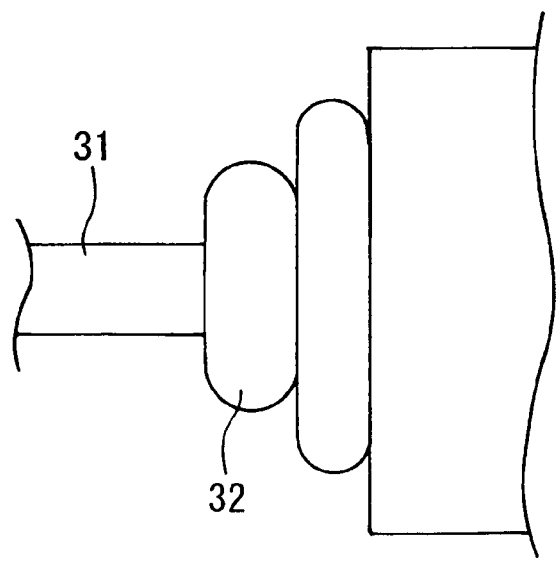
FIG. 2 is a partially enlarged view showing a support member-basal end part of a mouth member-rotator shown in FIG. 1 and the vicinity thereof.

The present invention is described in detail below with referring to the drawings.

Figure 9:
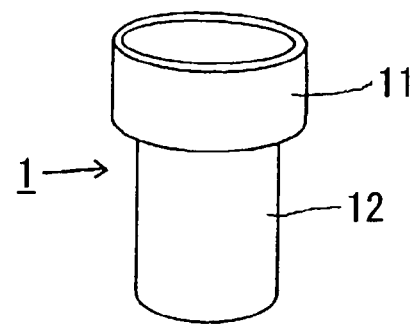
FIG. 9 is a mouth member.
Figure 10:
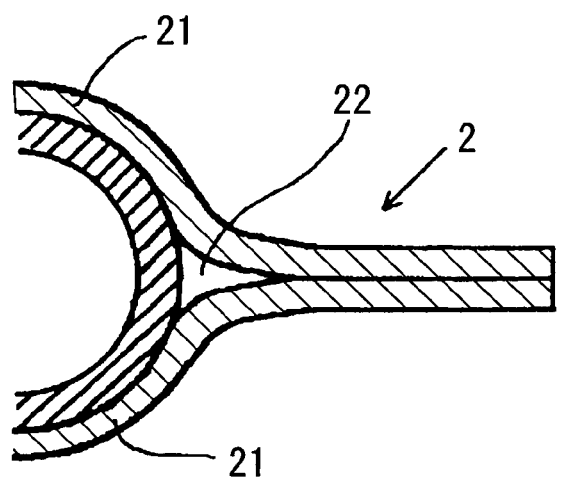
FIG. 10 is a cross-sectional view of the A-shaped part with a gap.

The mouth member 1 shown in FIG. 9, which forms the liquid inlet/outlet of a bag with a mouth member, comprises a thermoplastic resin and has a circular cross section. The lower part of the mouth member 1 shown in FIG. 9 forms a mouth member melt-bonding part 12 which is melt-bonded to a bag unit and the upper part has a rubber plug-receiving part 11 enlarged in the diameter with a step, in which a rubber plug or a rubber plug body is provided. The outer cross-sectional shape of the mouth member is not limited only to a circular shape but may be another shape nearly inscribing a circle, such as square or regular hexagon.

Most mouth members 1 used at present have an outer diameter of 7 to 25 mm, a thickness of 0.5 to 3 mm and a height of about 20 to 80 mm.

Examples of the thermoplastic resin used for the mouth member 1 include polyester resins (e.g., polyethylene terephthalate, polybutylene terephthalate), polyolefin-based resins (e.g., polypropylene, polyethylene), polycarbonate, polyether sulfone and cyclic polyolefin. Among these, preferred are polyolefin-based resins, more preferred is single or blend resins of polyethylene-based resins such as high-density polyethylene, linear low-density polyethylene, high-pressure low-density polyethylene and polyethylene produced by using a metallocene catalyst. This thermoplastic resin is preferably the same resin as the flexible film constituting the bag unit or a resin containing it, because when the same resin as the flexible film is used, strong melt-bonding can be obtained.

The mouth member 1 may have a multilayer structure. In particular, the mouth member preferably has such a structure that the outermost layer forming the melt-bonding face is the same resin or a resin of the same system as the innermost layer of the flexible film constituting the bag unit and the inner layer is a resin having heat resistance higher than the outermost layer of the mouth member and having high rigidity. This structure is advantageous in that deformation of the mouth member can be prevented during heating and even when an injection needle is accidentally aslant stuck into the mouth member with a rubber plug at an angle, the injection needle can be prevented from piercing through the inside to the outside of the side face of the mouth member.

The bag unit comprises a flexible film 2 and may have a single chamber or multiple chambers partitioned by a device capable of causing these chambers to communicate with each other. Examples of the construction material for the flexible film 2 include polyolefin resins such as polyethylene, polypropylene and polybutene, polyamide resins and polyester resins. The construction material is preferably a resin of the same kind as the melt-bonding face of the mouth member 1 and having an approximated melting point or a blend of such resins and preferably a thermoplastic resin selected from polyolefin-based resins.

The flexible film may comprise a single layer or multiple layers and may have a vapor deposition layer of aluminum, aluminum oxide, silicon oxide or the like. The thickness of the flexible film is approximately from 100 to 400 μm. In the case of a multilayer film, the inner surface of the bag unit is preferably formed of a thermoplastic resin selected from a resin the same as the melt-bonding face of the mouth member, a construction material of the same kind as the melt-bonding face of the mouth member or having an approximated melting point, and a blend resin containing such a material. Examples of the flexible film which is used include a tubular film produced by inflation molding and a film produced by T-die molding and then bent or superposed one on another to form a bag.

The production apparatus of a bag with a mouth member of the present invention is described below with reference to FIGS. 1 to 6.

The production apparatus of a bag with a mouth member of the present invention is an apparatus for producing a bag with a mouth member by melt-bonding a tubular mouth member 1 comprising a thermoplastic resin and a bag unit comprising a flexible film 2, and comprises at least preheater 4 for heating a mouth member 1, and a mouth member-rotator 3 for rotating the heated tubular mouth member 1 around its cylinder axis.

Also, the production apparatus of a bag with a mouth member of the present invention comprises at least a mouth member-rotator 3 for rotating a tubular mouth member 1 around its cylinder axis, a mouth member supplier 5 for supplying and setting a mouth member 1 to the rotator, preheater 4 for heating the rotating mouth member 1, a melt bonding device for inserting the heated mouth member into the opening part of a bag unit and pressing and thereby melt-bonding the mouth member and the opening part of the bag unit, cooler for cooling the melt-bonded bag with a mouth member, and device for removing the cooled bag with a mouth member.

FIG. 1 is a perspective view showing one example of the mouth member-rotator 3 for use in the present invention. The mouth member-rotator 3 shown in FIG. 1 comprises a support member 31 (which may be, depending on the case, a support member 31 having an air suction port 34), a support member basal end part 32 and a driven unit 33. In the example shown in FIGS. 1 and 2, the support member basal end part 32 has a two-stepped structure, in which the center part is slightly bulging in the circumferential direction. Thus, the center part unfailingly fixes a rubber plug-receiving part 11 to the support member basal end part 32 at the inner side of the rubber plug-receiving part 11, and with this support member basal end part 32, two kinds of mouth members 1 differing in the inner diameter of the rubber plug-receiving part 11 can be used.

In order to rotate the mouth member 1 around its cylinder axis, the mouth member 1 must be fixed to the support member 31. In the mouth member 1, the inner diameter of the heated part corresponding to the cylindrical part 12 to be melt-bonded with a flexible film may vary due to the heat applied, and therefore, this part is preferably not used as the fixing site to the support member 31 but, as shown here, the rubber plug-receiving part 11 which is a non-heated part of the mouth member 1 is preferably used as the fixing site to the mouth member-rotator. The means of removably fixing the non-heated part of the mouth member to the support member basal end part is not limited to the example shown in FIGS. 1 and 2.

In the operation, the support member basal end part 32 is inserted and fitted into the rubber plug-receiving part 11 of the mouth member 1 and fixes and rotates the mouth member 1. The size of the support member 31 is sufficient if it is capable of keeping steady the mouth member 1 when the mouth member is set thereon and is rotated. The size is selected so that the mouth member 1 can be slidably supported (the size may provide some slight room as long as the mouth member can be kept steady).

Figure 3:
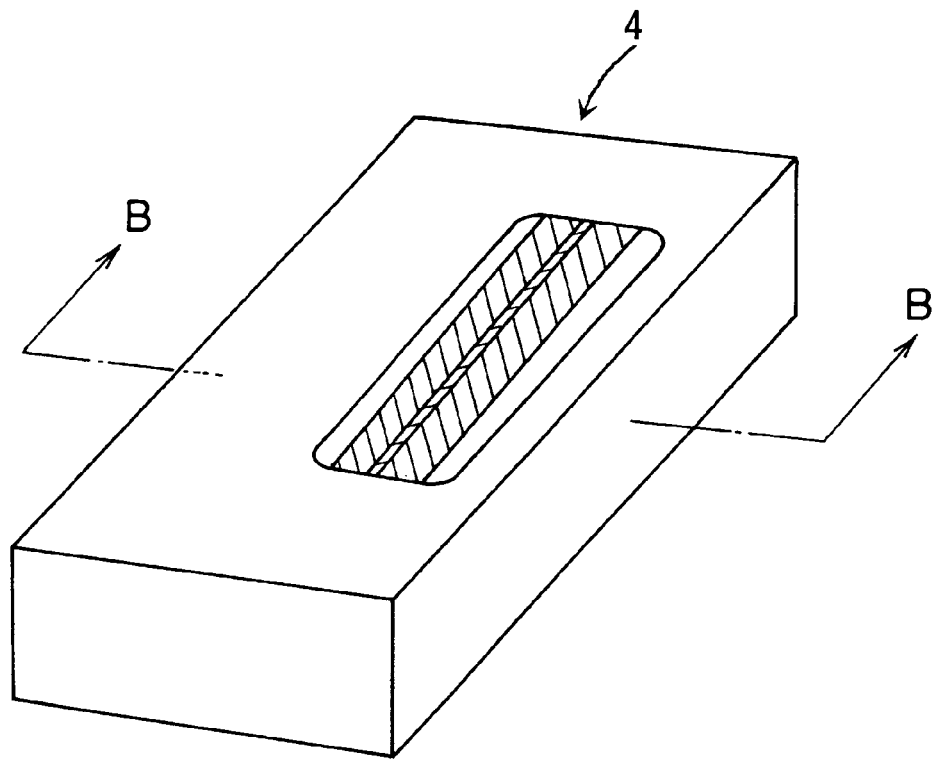
FIG. 3 is a perspective view showing one example of the preheater.

FIG. 3 shows one example of the preheater 4 for use in the present invention. In this example, a heat source comprising an infrared lamp is held in a chassis, and a window part for exposing the heat source is provided in the chassis. In the window part, an arbitrary shutter (not shown) is preferably provided so that the area allowing for the passing of radiated heat rays can be changed and thereby the heating degree can be adjusted. As for the heat source, a hot-air heater, an electric resistance heating element, a far infrared lamp and the like may be used in addition to an infrared heater, but a heat source capable of heating by radiant heat, such as an electric resistance heating element, an infrared lamp and a far infrared lamp, is advantageous and preferred in view of the likely attachment of foreign materials at the time of heating or simplification of the machine structure.

Figure 4:
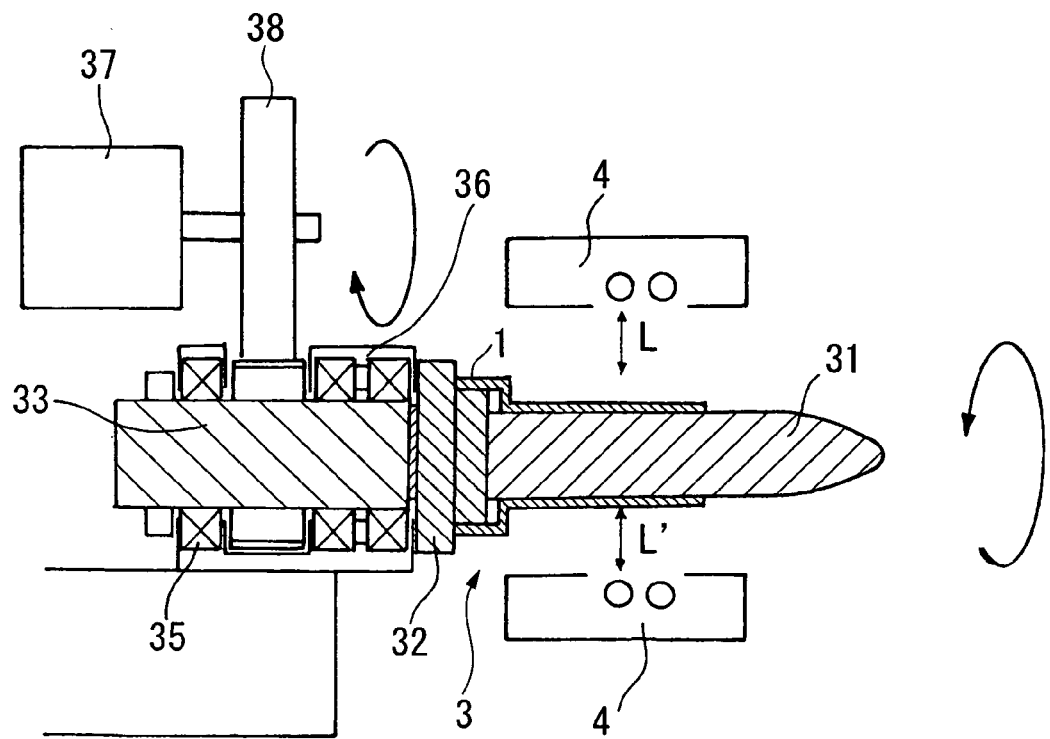
FIG. 4 is a cross-sectional view of the preheated state.

FIG. 4 shows the state where a mouth member 1 is held on the mouth member-rotator 3 and heated while rotating the mouth member 1 by two preheaters 4. In FIG. 4, the mouth member-rotator 3 is shown in a cross-sectional view along the A-A line of FIG. 1 and the preheater 4 is shown in a cross-sectional view along the B-B line of FIG. 3. In the mouth member-rotator 3 of FIG. 4, the support member 31 having a circular cross section is axially supported by two bearings 35 and 36.

A driven unit 33 for receiving a rotation driving force from a driving apparatus such as motor 37 shown in FIG. 4 is provided between bearings 35 and 36 and in association with the rotation of the driven unit 33, the mouth member 1 set and fixed to the support member basal end part 32 rotates. As another example of the rotation mechanism, the mouth member 1 may be rotated by applying a force to the outer peripheral part of the rubber plug-receiving part 11 which is a non-heated part. The direction of rotation is not particularly limited.

The distance L, L' between the surface of the preheater 4 and the surface of the melt-bonding part of the mouth member is about 0.5 mm or more, and preferably on the order of 1 to 5 mm.

Figure 5:
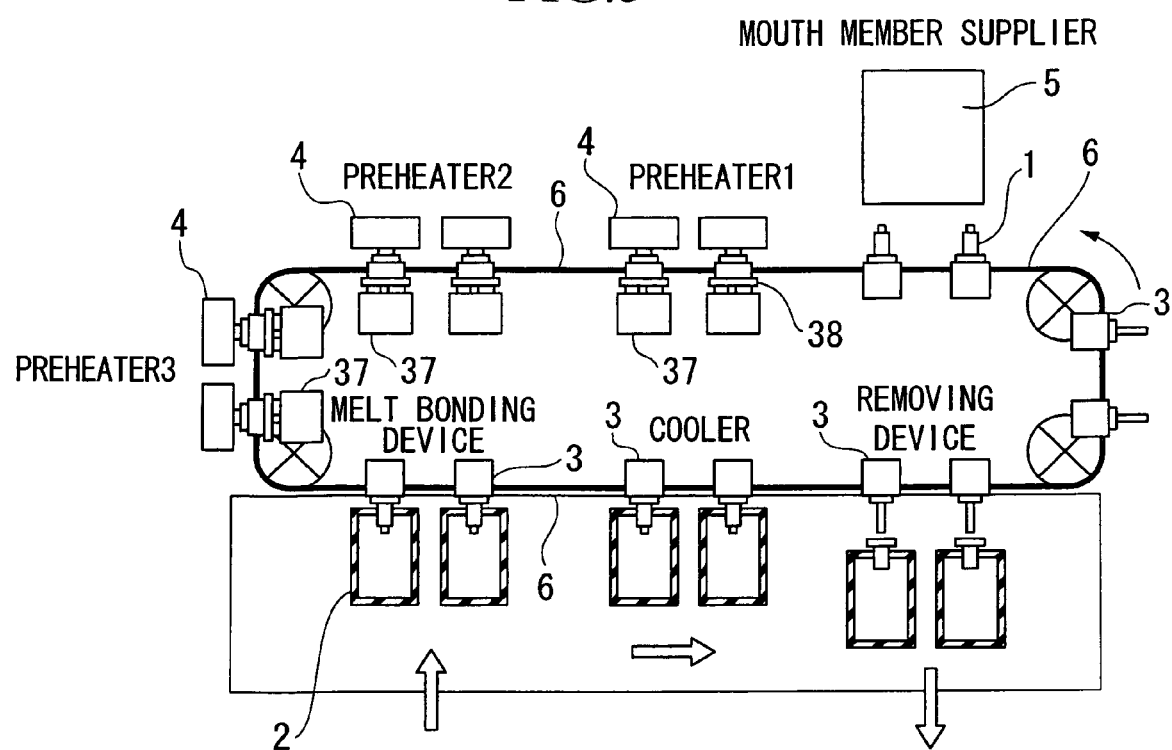
FIG. 5 is one example of the production apparatus of a bag with a mouth member.

FIG. 5 shows one example of the production apparatus of a bag with a mouth member, which comprises apparatus for producing the bag with a mouth member of the present invention and integrates a mouth member 1 and a flexible film 2.

The production apparatus of a bag with a mouth member shown in FIG. 5 comprises an endlessly connected conveyer 6 which is moving device for moving, for example, the mouth member-rotator 3 to implement a circuit, a mouth member-rotator 3 fixed to the conveyer 6, and a mouth member supplier 5 for supplying and engaging a mouth member 1 to the mouth member-rotator 3. Also, a mouth member supply part, a preheating part, a melt-bonding part, a cooling part and a removal part are provided. Corresponding to these parts, there are a mouth member supplier, a preheater, a melt-bonding device, a cooler and a removing device, respectively. In the example of FIG. 5, 8 sets of mouth member-rotators with one set consisting of two mouth member-rotators are fixed on the conveyer 6 at equal intervals and two bags with a mouth member can be produced at the same time. Of course, the mouth member-rotator can be provided to produce one bag with a mouth member or a set of three or more bags with a mouth member. Also, the preheating part is divided into three stages, but the preheating may be performed in a larger number of stages. The conveyer 6 repeats driving and stopping at fixed time intervals.

In the preheating part, a motor 37 as a driver which rotates the support member 31 of the mouth member-rotator 3 through a driven unit 33 is disposed at a fixed position on the inner side of the conveyer 6 and preheater 4 is disposed at a fixed position on the outer side of the conveyer 6. In the preheating part, a roller 38 driven by the motor 37 abuts against the driven unit 33 at a static position of the conveyer, whereby the support member 31 of the mouth member-rotator 3 is rotated. Of course, a motor 37 may be fixed to each mouth member-rotator so that the motor 37 can be moved together with the conveyer 6. Also, the support member 31 of the mouth member-rotator 3 can be made to rotate through the movement of the conveyer 6. Furthermore, a mechanism of causing the support member 31 of the mouth member-rotator 3 to rotate together with the movement of the conveyer 6 is preferably provided between the preheating part and the melt-bonding part with or without providing a preheater, so that heating of the mouth member 1 immediately before melt-bonding is sufficiently uniformalized.

The preheater 4 shown in FIG. 5 may also be designed to continuously heat the mouth member 1. In this case, the preheater 4 is disposed in the post-step after a mouth member 1 is set on the mouth member-rotator 3 by the mouth member supplier 5, and thereafter, the mouth member is continuously heated until reaching the melt-bonding device. The preheater is removed in front of the melt-bonding device and caused to move circuit to the post-step of the mouth member supplier 5. The heated mouth member 1 set on the mouth member-rotator 3 is moved as-is to the melt-bonding device. At this time, the conveyer 6 may also be continuously driven, so that in the entire system, a mouth member 1 is melt-bonded to a film melt-bonding part 21 of a flexible film 2 to produce a bag with a mouth member.

In the production apparatus of a bag with a mouth member shown in FIG. 5, the cylinder axis of the mouth member 1 is kept in the horizontal direction, but the mouth members 1 at respective parts of mouth member supply part, preheating part, melt-bonding part, cooling part and removal part each may be in the state that the cylinder axis is perpendicularly or obliquely directed. In the production apparatus of the present invention, the mouth member 1 is rotated and thereby uniform heating of the mouth member can be realized independently of the direction of the cylinder axis of the mouth member 1.

In the production apparatus shown in FIG. 5, the melt-bonding part and the cooling part have the same static time, but when the preheating part is constituted in multiple stages, a machine structure taking account of the difference between the melt-welding time (time when pressed by a sealing mold or other device) and the preheating time can be easily designed and this is preferred.

Figure 6A:
FIG. 6 is a cross-sectional view of the sealing mold.
Figure 6A:

Although not shown in FIG. 5, for example, a sealing mold as shown in FIG. 6 is provided in the melt-bonding part and a cooling mold as contact cooler is provided in the cooling part. In preparation for the case where, for example, the transfer from melt-bonding to cooling takes time due to low speed of the moving apparatus, air blowing apparatus for enforced cooling is preferably provided between the melt-bonding part and the cooling part of the conveyor.

Production Method

One embodiment of the production method of a bag with a mouth member of the present invention is described below by referring to FIG. 5, but the present invention is not limited thereto.

A mouth member 1 into which a support member 31 of a mouth member-rotator 3 is inserted by a mouth member supplier 5 comprising a part feeder or the like is fitted and fixed to a support member basal end part 32, thereby completing the loading.

As a conveyor rotates in the arrow direction, the mouth member 1 is moved toward the preheating part and once made static. The static time is not particularly limited but is preferably on the order of 3 to 15 seconds. At this time, a motor 37 disposed at a fixed position comes into contact with a driven unit 33 of the mouth member rotator 3 and the mouth member 1 rotates together with the support member 31, thereby starting the preheating step. The conveyor on moving proceeds at a speed of about 5 to 50 m/min.

The rotating speed of the mouth member 1 is from 5 to 100 rpm, preferably from 10 to 80 rpm. The heat source temperature of preheater 4 is 300° C. or more, preferably from 400 to 900° C. By rotating the mouth member 1, the heat quantity received from the heat source which is fixed can be made more uniform over the entire circumference of the mouth member melt-bonding part 12. Accordingly, the heat quantity received by the mouth member melt-bonding part 12 in the preheating step is stably uniformalized.

The temperature of the thermoplastic resin softened at the mouth member surface portion in the preheating part is a temperature at which it is possible for the mouth member resin to fill the A-shaped gap during the melt-bonding performed by heating and pressing with use of a sealing mold in the next melt-bonding part. Whether the thermoplastic resin on the mouth member surface is softened can be easily confirmed by visual observation. If the temperature is too high, this may raise a problem such as generation of defective thermoplastic resin used for the mouth member 1 or deformation of the mouth member. By the method of heating the mouth member 1 while rotating it, generation of such problems can be prevented as compared with conventional methods of heating the mouth member 1 without rotating it, and the latitude in the adjustment of the heat source temperature can be widened. In addition, a reduction in rigidity in the entire mouth member due to local overheating can be prevented, and also, the abnormal deformation of the mouth member 1 attributable to the elimination of residual stress present in the mouth member 1 produced by injection molding can be prevented. Furthermore, by virtue of heating while rotating, generation of local overheating can be prevented and, in turn, thinning of the film melt-bonding part 21 due to overheating can be prevented, as a result, the obtained bag with a mouth member can have excellent drop strength.

The melt-bonding step of pressing and thereby melt-bonding the mouth member 1 and the film melt-bonding part 21 is a step of inserting the heated mouth member 1 into the opening part of a bag unit and pressing these by, for example, a sealing mold, thereby melt-bonding the mouth member melt-bonding part 12 and the film melt-bonding part 21. At the point when the mouth member-rotator passes through the preheating part and is made static at the position of the melt-bonding part, the preheating step is completed and a melt-bonding step is subsequently started.

In the melt-bonding step of pressing and thereby melt-bonding the mouth member 1 and the film melt-bonding part 21, for example, the film melt-bonding part 21 and the mouth member 1 are pressed by a sealing mold as shown in FIG. 6A to melt-bond the mouth member melt-bonding part 12 and the melt-bonding part 21. The temperature of the sealing mold is 10° C. or more higher than the melting point of the resin constituting the inner surface of the film and, for example, in the case where the film comprises a polyethylene resin, the temperature is from 110 to 170° C. and the melt-bonding time is approximately from 1 to 4 seconds. The time after passing through the preheating part until pressing by a sealing mold is preferably shorter, but due to restriction by the production apparatus, the time is usually on the order of 1 to 4 seconds. If this time exceeds 4 seconds, the surface temperature of the mouth member melt-bonding part 12 falls and the seal strength between the mouth member and the bag unit tends to be insufficient. When the corner of the mold takes a small radius (R) as shown in FIG. 6B, formation of a thin strip is facilitated.

Figure 6B:
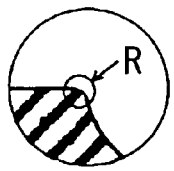

The sealing mold has a cross sectional shape comprising a semicircle and a flat part and, as shown in FIG. 6B, is designed to form a round shape at the connection part of the semicircle and the flat part, that is, at the A-shaped part between the mouth member and the film. R is from 0.2 to 2 mm, preferably from 0.3 to 1.7 mm. If R is too large, formation of an A-shaped gap cannot be prevented, whereas if it is too small, troubles are readily generated, for example, the film is scratched or an insufficient thin strip is formed. The diameter of the semicircle is slightly smaller than the size obtained by adding the film thickness to the diameter of the mouth member melt-bonding part 12.

Figure 11:
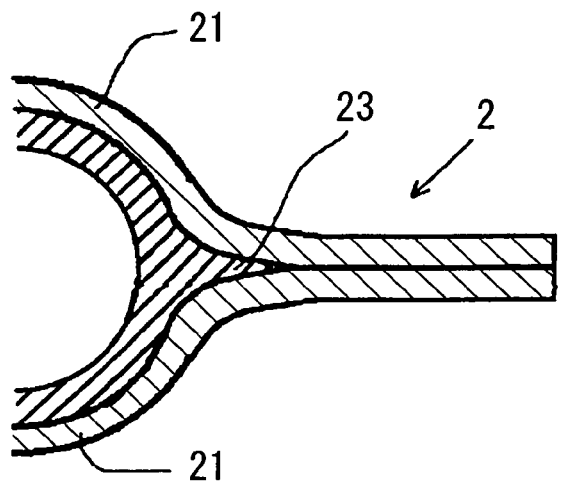
FIG. 11 is a cross-sectional view of the A-shaped part using a mouth member having thin strips extending therefrom.

In the preheating step of the present invention, the mouth member is uniformly heated and free from uniform deformation and, therefore, the mouth member and the bag unit can be fitted at an exact position with respect to the sealing mold. Furthermore, since the mouth member and the bag unit are melt-bonded in such an exactly positioned state, as shown in FIG. 11, the softened resin of the mouth member melt-bonding part 12 pressed to the film melt-bonding part 21 of the flexible film 2 stably spreads to form a thin strip 23 and fill the A-shaped gap 22.

The thin strip 23 suitably has a size on the order that the thickness is from 50 to 200 μm and the length is from 0.1 to 2 mm. The present invention provides a bag with a mouth member having the mouth member 1 provided with a thin strip of such a size and a bag with a mouth member free from formation of an A-shaped gap 22 and generation of liquid leakage can be stably produced.

After the mouth member is melt-bonded to the flexible film 2, the melt-bonding part is sandwiched by a cooling mold (not shown). Since the mouth member is uniformly preheated and prevented from deformation, similarly to the case of sandwiching the mouth member and the flexible film by a sealing mold, the material to be sandwiched and the mold can be exactly and stably positioned also at the time of sandwiching the mouth member and the flexible film by a cooling mold and, therefore, a thin strip can be stably shaped.

In the above-described production of a bag with a mouth member, it is also a preferred embodiment to decompress the inside of the bag unit by sucking out the air inside the bag unit at the time of the melt-bonding to tightly contact the mouth member melt-bonding part 12 with the film melt-bonding part 21 and then melt-bond the mouth member 1 and the flexible film 2. This is particularly effective in the case where the inner diameter of the mouth member of the bag with a mouth member exceeds 10 mm.

Figure 7:
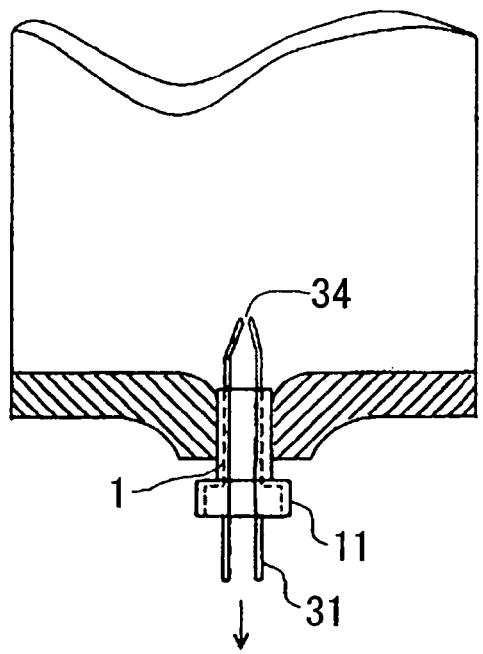
FIG. 7 is a cross-sectional view of the mouth member and the bag unit when decompressed and melt-bonded.
Figure 8:
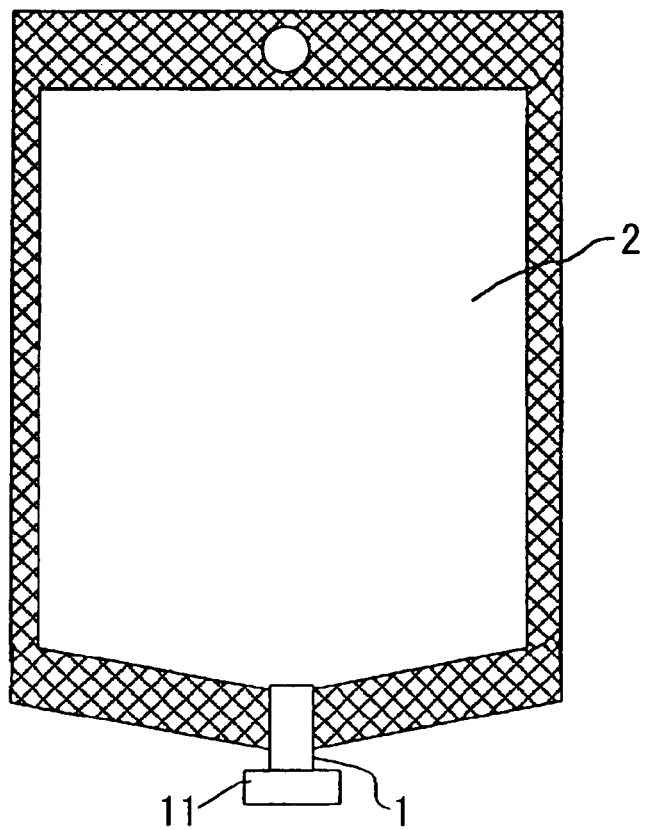
FIG. 8 is an infusion bag.

FIG. 7 shows this embodiment. The support member 31 of the mouth member-rotator 3 forms a nozzle having therein a duct which runs through to the distal end. The nozzle has an air suction port 34 at the distal end and has a shape gradually decreased in the cross-sectional area toward the nozzle distal end to match with the inflated form of the film. The position where the cross-sectional area starts gradually decreasing is 5 mm or more from the distal end of the nozzle and at the same time, closer to the distal end than the end part of the mouth member. The support member is inserted such that the distal end of the nozzle protrudes inside the bag unit at least 5 mm more than the end part of the mouth member.

The timing of decompression is before the sealing mold is secured or simultaneously with the closing of the sealing mold. By performing decompression, the flexible film 2 is fixed, the film melt-bonding part 21 and the mouth member melt-bonding part 12 are tightly contacted, and the film is fixed in agreement with the shapes of the mouth member melt-bonding part 12 and the nozzle.

After cooling, the decompression is released. By performing the melt-bonding and cooling in the state that the inside of the film unit is decompressed by sucking out the air therein, the flexible film 2 can be fixed until the mouth member 1 and the flexible film 2 are melt-bonded by a sealing mold and then cooled. In this way, the melt-bonding is performed while inhibiting free movement of the flexible film 2 and this provides effects that the melted and softened film is not stretched, the film is prevented from thinning at the boundary between the melt-bonding part and the non-melt-bonding part of the mouth member, the reduction in the drop strength of bag, which is ascribable to thinning, is in turn decreased, and also, the generation of pinholes at the boundary is prevented.

EXAMPLES

Example 1

A mouth member comprising a melt-bonding part having an outer diameter of 13 mm and an inner diameter of 11 mm was produced by injection molding of polyethylene. Also, a bag having a width of 140 mm and a length of 300 mm, in which the outer periphery except for the opening part to be fixed with a mouth member was melt-bonded, was produced from a 300 μm-thick tubular film obtained by inflation molding of polyethylene. From this mouth member and this bag, a bag with a mouth member was produced by using the apparatus shown in FIG. 5.

By using, as the preheater, a heating device in which a linear infrared lamp at a temperature of 600° C. was provided in the upper and lower portions at the position of 3 mm from the surface of the mouth member, the mouth member held on a support member was heated in preheating parts 1 to 3 each for 4 seconds at a rotation speed of 40 rpm. Subsequently, the opening part of the bag was fitted into the heated mouth member in the melt-bonding part and by using a sealing mold as shown in FIG. 6, melt-bonded while pressing these by upper and lower sealing molds under conditions such that the temperature was 170° C., the pressing time was 2 seconds and the pressure was 0.3 MPa. Thereafter, the bag was cooled by a cooling mold having the same shape for 2 seconds to obtain a bag with a mouth member.

100 Units of this bag with a mouth member were prepared and after filling 500 mL of water into each bag, the bags were tightly plugged, externally pressed to give an internal pressure of 0.07 MPa, and then left standing for 5 minutes. No water leakage was observed in any of the bags with a mouth member.

Example 2

A bag with a mouth member was produced in the same manner as in Example 1 except that a mouth member comprising a melt-bonding part having an outer diameter of 17 mm and an inner diameter of 13 mm was used, a nozzle having an air suction port was used for the support member, and air inside the bag was sucked out from the start of pressing by the sealing mold until the opening of the cooling mold.

100 Units of this bag with a mouth member were prepared and after filling 500 mL of water into each bag, the bags were tightly plugged, externally pressed to give an internal pressure of 0.07 MPa, and then left standing for 5 minutes. No water leakage was observed in any of the bags with a mouth member.

INDUSTRIAL APPLICABILITY

The present invention provides a production method capable of realizing uniform surface temperature of the mouth member in the preheating step, stably preventing generation of an A-shaped gap, and thereby obtaining a bag with a mouth member excellent in the liquidtightness of the melt-bonded part between the mouth member and the bag unit, and also provides a production apparatus therefor.

According to the method of the present invention, the surface of the mouth member is uniformly heated and, by virtue of a uniform surface temperature, a fin-like thin strip can be unfailingly shaped and generation of an A-shaped gap can be stably inhibited, so that liquid leakage from the bag with a mouth member can be prevented. Furthermore, the film constituting the bag unit can be prevented from thinning due to heating at the distal end of the mouth member, so that a high drop strength can be maintained in the bag and the productivity of manufacturing the bag with a mouth member for housing various medical preparations, physiological saline, infusion solution (e.g., glucose solution, blood), and the like can be increased. Therefore, the production method of the present invention is useful.

The invention claimed is:

1. A method for producing a bag with a mouth member by melt-bonding a tubular mouth member comprising a thermoplastic resin and a bag unit comprising a flexible film, said method comprising preheating the tubular mouth member set on a mouth member-rotator fitted to an endlessly connected moving device for moving the mouth member-rotator, while rotating the tubular mouth member around its cylinder axis, inserting the heated mouth member into an opening part of the bag unit and pressing and thereby melt-bonding the mouth member to the opening part of the bag unit, cooling and removing the bag unit with the mouth member, and the mouth member-rotator travels through a circuit of preheating, inserting, pressing, and cooling and removing by the endlessly connected moving device.

2. The method for producing a bag with a mouth member as claimed in claim 1, wherein the preheating is performed by radiant heat.

3. The method for producing a bag with a mouth member as claimed in claim 1, wherein in the course of inserting the heated mouth member into the opening part of the bag unit and pressing melt-bonding, the inside of the bag unit is decompressed by sucking out air inside the bag unit.

4. The method for producing a bag with a mouth member as claimed in claim 1, wherein the preheating step comprises preheating the tubular mouth member fixed to a support member on the mouth member-rotator fitted to the endlessly connected moving device for moving the mouth member-rotator, while rotating the tubular mouth member around its cylinder axis on the support member.

5. An apparatus for producing a bag with a mouth member by melt-bonding a tubular mouth member comprising a thermoplastic resin and a bag unit comprising a flexible film, said apparatus comprising a mouth member-rotator for rotating a tubular mouth member around the cylinder axis of said tubular mouth member, and the mouth member-rotator is fitted to an endlessly connected moving device, a mouth member supplier for supplying and setting a mouth member to said rotator, a preheater for the rotating mouth member, a melt bonding device for inserting the heated mouth member into the opening part of a bag unit and pressing and, thereby, melt-bonding the mouth member and the opening part of the bag unit, a cooler for the melt-bonded bag with a mouth member, and a removing device for removing the cooled bag with a mouth member, and the mouth member-rotator fitted to the endlessly connected moving device moves sequentially through a circuit of mouth member supplying, preheating, melt-bonding, cooking and removing the bag with a mouth member.

6. The apparatus for producing a bag with a mouth member as claimed in claim 5, wherein the mouth member-rotator comprises a support member for slidably supporting a mouth member, a support member basal end part for removably fixing the non-heated part of the mouth member to the support member, and a driven unit for rotating the mouth member.

7. The apparatus for producing a bag with a mouth member as claimed in claim 5, wherein the heat source of the preheater has a linear shape.

8. The apparatus for producing a bag with a mouth member as claimed in claim 5, wherein the heat source of the preheater comprises a pair of opposing heat sources opposing so as to sandwich the mouth member.

9. The apparatus for producing a bag with a mouth member as claimed in claim 5, wherein the mouth member-rotator has a duct for sucking out the air inside the bag with a mouth member.

* * * * *